United States Patent [19] [11] 3,743,466
Gampe [45] July 3, 1973

[54] APPARATUS FOR THE PRODUCTION OF HOLLOW BODIES OF THERMOPLASTIC MATERIALS IN A BLOWING PROCESS

[75] Inventor: Egon Gampe, Monheim, Germany

[73] Assignee: Rheinmetall GmbH, Duesseldorf, Germany

[22] Filed: Apr. 23, 1971

[21] Appl. No.: 136,732

[30] Foreign Application Priority Data
Apr. 25, 1970 Germany.............. P 20 20 357.0

[52] U.S. Cl. ............................. 425/326, 425/451
[51] Int. Cl. ........................................... B29d 23/03
[58] Field of Search................. 425/326, 387, 450, 425/451

[56] References Cited
UNITED STATES PATENTS
3,583,031  6/1971  Kader et al. .................. 425/326 X
3,154,809  11/1964  Fischer ............................ 425/326
3,496,600  2/1970  Heston............................. 425/326

FOREIGN PATENTS OR APPLICATIONS
1,498,659  9/1967  France............................. 425/326

Primary Examiner—J. Spencer Overholser
Assistant Examiner—Michael O. Sutton
Attorney—Ernest G. Montague

[57] ABSTRACT

An apparatus for the production of hollow bodies of thermoplastic synthetic material in a blowing process with two blow-molds swingable between a spray head of an extruder and a blowing station, which comprises means for alternatingly receiving extruded raw hoses in the blow-mold with its closing blow-mold halves and for feeding the raw hoses to a blow station. A U-shaped swinging frame is provided which has legs and closing plates. The U-shaped swinging frame has a box-shaped connecting part and a flyingly mounted axle is also provided. The U-shaped swinging frame is suspended on the axle. A carrying frame secures the axle and the axle is disposed such that the vertical symmetrical plane of at least one of the spray heads is arranged in the crossing point of arcs of a circle defined by both blow molds.

6 Claims, 5 Drawing Figures

APPARATUS FOR THE PRODUCTION OF HOLLOW BODIES OF THERMOPLASTIC MATERIALS IN A BLOWING PROCESS

The present invention relates to an apparatus for the production of hollow bodies of thermoplastic synthetic material in a blowing process, in general, to such apparatus, which operates with two blow-molds swingable between an extruder and a blow-mandrel, which molds receive alternately the extruded hose forms with their closing blow-mold halves and feed the same to the blowing station.

In a known blow-mold machine of this type, one or multiple extruder heads are connected with a horizontally disposed screw cylinder of the extruder, from the downwardly directed mouth pieces of the extruder heads emerge continuously hose forms, which are taken over by the blow-molds upon reaching a predetermined length. The blow-molds comprise two halves, which in turn are secured on vertical closing plates. The substantially rectangular closing plates are displaceably mounted on two traverses, for the purpose of opening and closing, which traverses penetrate the closing plates at two diagonally oppositely disposed corners.

In addition to the opening and closing of the blow-mold, the closing plates are arranged as carriers of the blow-molds for lowering. By means of a hydraulic drive, the closing plates are fed to the actual blowing station during a quarter of a circular movement, in which one or a plurality of blow-mandrels are inserted into the hose form or forms.

Upon lowering of this blow-mold, a second blow-mold is lifted, which is mirror-like arranged to the first one and likewise secured to closing plates and describes a quarter of a circle movement to below the extruder head of the extruder. By a particular control of the closing plates, it is brought about, that the closing plates and thereby the blow-molds retain their position unchanged in spite of the swinging movement.

As already mentioned, the opening and closing of the blow-mold-halves over the traverses, which, depending upon the arrangement, can hinder on the closing plates the hose formation from the extruder head of the extruder, insofar as the hose form is engaged and thereby damaged already before reaching the required length by the traverse which is in front during the upward movement, and disposed horizontally in the upper closing plate corner. Nothing would remain, than to control the hose length formation such, that no engagement of the hose with the traverse takes place, until the blow-mold carrier with the open mold-halves has assumed its end position below the extruder. This has as a consequence a reduced ejection output. If the traverses are arranged, however, such, that the traverse, disposed in front during the upward movement of the closing plates, assumes the lower closing plate corner, the hose formation would no more be interfered with, yet difficulties would arise in relation to the transfer of the blown objects to a transportation device, by example, a running conveyor band or a conveyor chain such, that in this case the traverse sits below in one corner, since also the means for the swinging movement of the closing plates over the other lower corner engage. It is to be added, that the carrier consisting of the closing plates including the blow-mold-halves secured thereto constitutes a relatively large moving mass, which is far distant from the swinging or pivot point.

A further drawback resides in the fact that in the known arrangement the free access to the closing plates is interfered with by the traverses. This arrangement hinders the fast finding and removal of operational disturbances, as well as the fast exchange of the blow-molds, the outer dimensions of which is likewise preset by the traverses.

It is one object of the present invention, to provide an apparatus for the production of hollow bodies which avoids the above-stated drawbacks of the known structures.

It is another object of the present invention to provide an apparatus for the production of hollow bodies of thermoplastic synthetic material in a blow process, which is charactized by an open structure and easy access to the blow-mold carriers, the blow-molds and the other machine parts.

It is still another object of the present invention to provide an apparatus for the production of hollow bodies, wherein the easily accessible blow-molds are arranged as freely as possible and permit participation on the swinging movement such, that the hose formation can take place likewise without hinderance, as well as the removal and the further transportation of the blown objects.

It is still another object of the present invention to provide an apparatus for the production of hollow bodies, wherein the blow-mold-halves of both blow-molds are disposed, by means of closing plates, on the leg ends of a U-shaped swinging frame and the swinging frame again with its box-shaped connecting part are suspended about or on a flyingly mounted axle, which in turn is secured on a supporting frame and in relation to the extruder head or heads of the extruder are arranged such, that the vertical symmetry axis of one or a plurality of extruder heads is disposed in the crossing point of circular arcs defined by both blow-molds.

A particular advantageous arrangement resides in accordance with the present invention in the fact, that the rotary or pivot points of the swinging frame disposed on both sides of the extruder head, are arranged in a plane and the upper end positions reached successively by both swinging frames are disposed in a substantially horizontal plane for receiving the hose forms.

Due to the fact that the closing plates, and thereby the blow-molds, are disposed at the leg ends of a U-shaped swinging frame, the gravity point of which is disposed within the frame, not only can the known traverses be eliminated, rather the moved masses are also held low in comparison with the traverse structure. This makes possible again a low wear and thereby a long life of the apparatus. Further advantages exist in the open structure and in the freely accessible arrangement of the blow-molds.

The improved accessibility to all parts of the machine is expressed although by the fact, that the hydraulic cylinder, making possible the movement of the swinging frame, is disposed adjacent the supporting frame.

In order that the blow-mold can be retained in the upper receiving position, as well as in the lower position constituting the blowing station, always in an unchanged position, the swinging frame with its straight line connecting the rotary point in the closing plate axis forms part of a parallelogram.

With these and other objects in view, which will become apparent in the following detailed description, the present invention will be clearly understood in connection with the accompanying drawings, in which.

Figure 1:
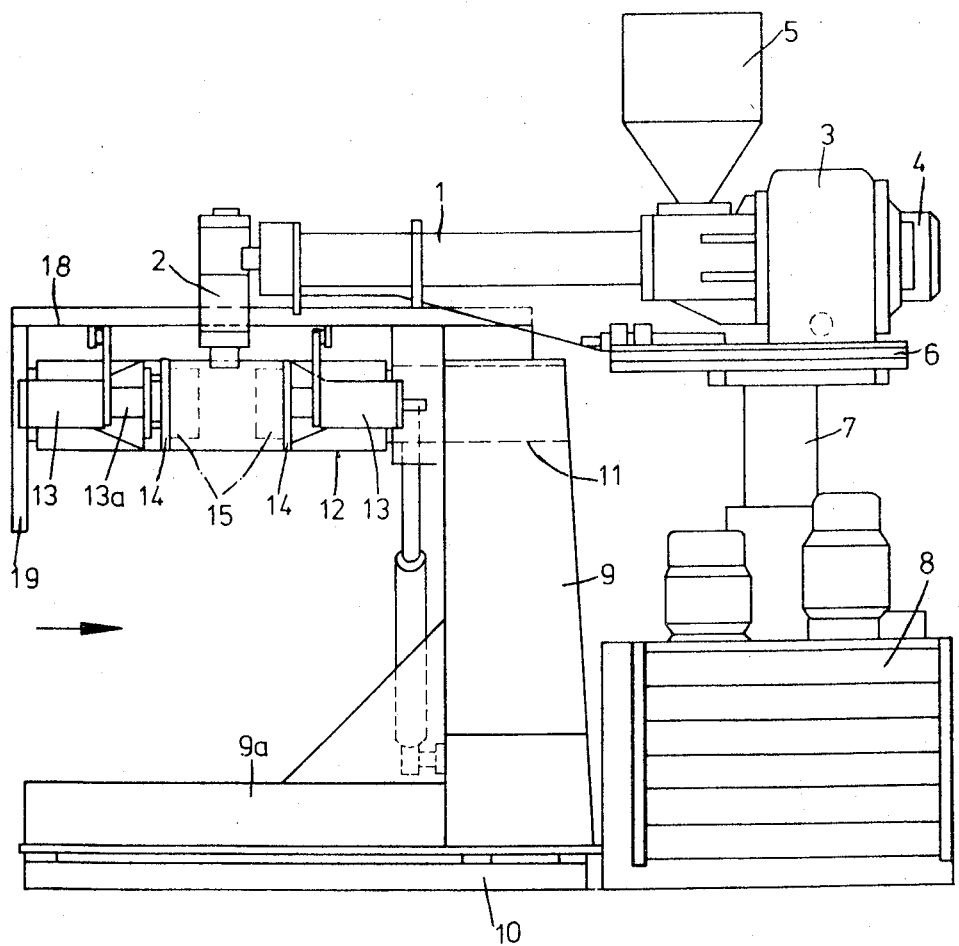
FIG. 1 is a side elevation of a blow-mold apparatus equipped with an extruder in a view along the section line I—I of FIG. 2.

Referring now to the drawings, the extruder 1 with its vertically downwardly angular extruder head 2 rests with its drive 3 and a hydraulic motor 4 as well as the storage hopper 5 sitting at the entrance to the screw cylinder and containing the starting material for the hollow bodies of synthetic material on a support 6, which forms the upper end of a vertical column 7. The column 7 projecting from a housing foot 8 can belong to a hydraulic system as a piston rod and can be arranged for the lifting as well as lowering and as well as the swinging of the extruder device resting on the support 6.

On both sides of the extruder, a carrying frame 9 is provided in corresponding distance, which carrying frame 9 is arranged with its foot 9a on a joint base plate 10 such, that both carrying frames 9 can be arranged relative to each other, as well as to the extruder head 2 of the extruder 1.

From the upper part of the supporting frame 9 projects a flyingly mounted axle 11, which receives the box-shaped part of a U-shaped swinging frame 12. The two conically arranged leg ends 12a of the swinging frame 12 carry each hydraulic cylinder 13, the axes of which disposed in one plane are arranged parallel to the axis 11 of the carrying frame 9. A piston rod 13a projects from the end of the cylinder 13 pointing towards each other, which piston rod 13a receives the closing plate 14. The latter is designed such, that it carries the blow half 15a of a blow-mold 15. In addition, the closing plate 14 is rotatably mounted about the axis 13a, which coincides with the axis 13a of the piston rod 13a, such that it retains its position unchanged in the upper position A receiving the hose for, as well as in the blow station B. This is made possible by a parallelogram guide of the closing plate 14, whereby the straight line 16a connecting the rotary point of the swinging frame 12 and the closing plate axis 13a, as well as a guide rod 16b immovably disposed above the swinging frame 12, which effects by means of a control joint bar 16c the closing plate 14 jointly with the short straight line 16d connecting the rotary point of the swinging frame 12 with the immovable rotary point of the guide rod 16b, form a parallelogram. Thereby, the guide rod 16b is suspended on the bottom side of a horizontal, U-shaped rail 18 resting on the carrying frame, which rail 18 extends over the entire width of the swinging frame 12 and is supported by a protection plate 19 covering the free end of the flyingly mounted axle 11.

The movement of the swinging frame 12 takes place by means of a hydraulic cylinder 17, which is rotatably movable in the lower range of the carrying frame 9 and on the foot 9a, respectively, and engages tightly on the carrying frame 9 along with a free end of its piston rod 17a on the swinging frame.

On a console 20 secured to the carrying frame 9 sit one or a plurality of blow-mandrels 21, which make possible in the move-in state the movement of the closing plates 14 from the position A into the position B.

Depending upon the formation of the blow-mold 15 as a single or multiple mold, the number of the blow-mandrels 21 belonging to one group can be varied.

Figure 2:
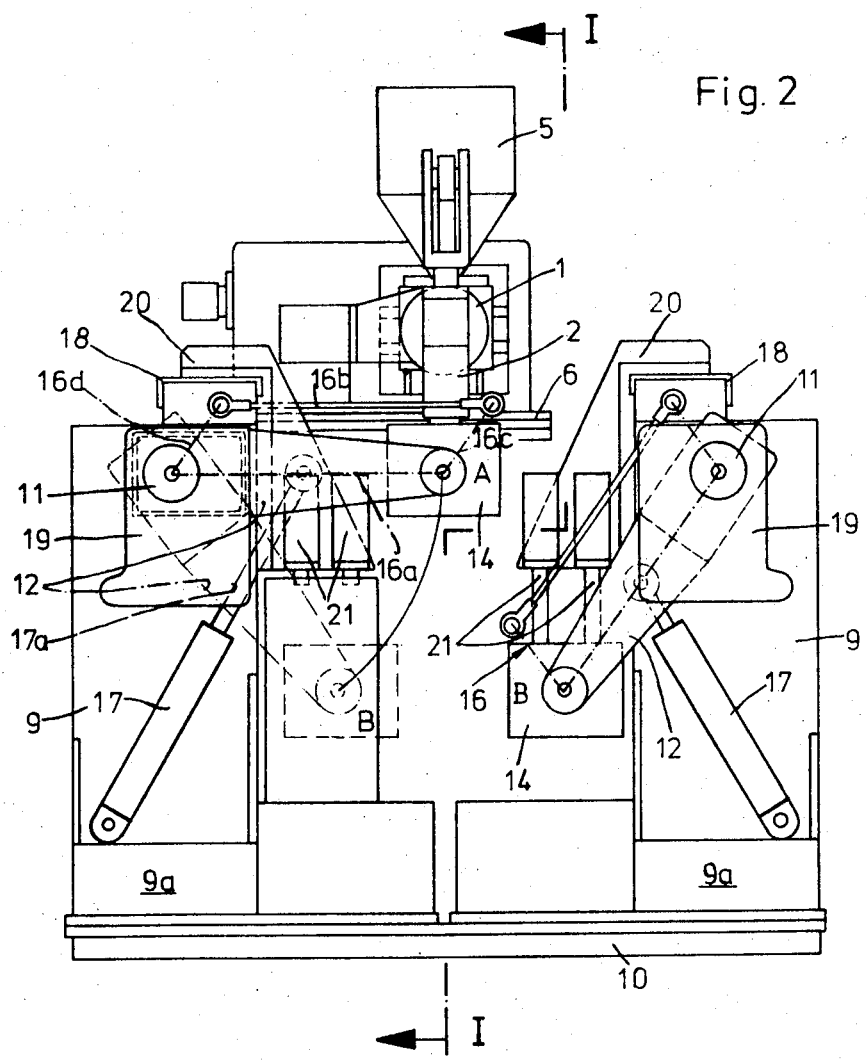
FIG. 2 is a front elevation of the apparatus shown in FIG. 1 seen in the direction of the arrow.
Figure 3:
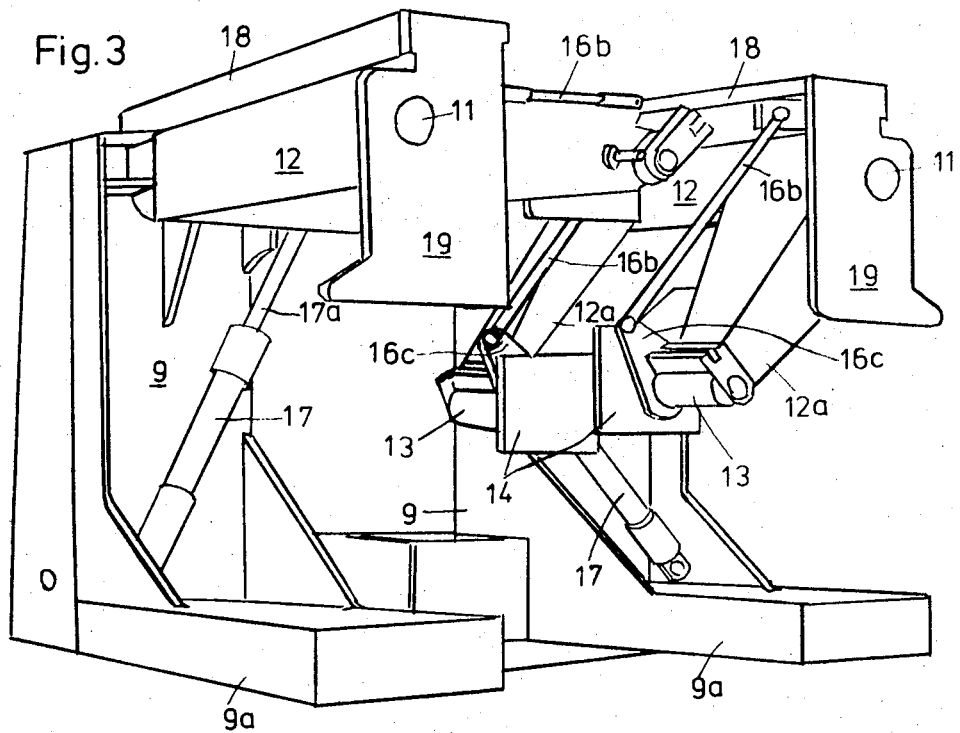
FIG. 3 is a prospective view of the apparatus with two supporting frames.

The operation of the apparatus designed in accordance with the present invention is as follows:

In FIG. 2 is disposed the swinging frame 12 shown on the left side in the position A, in which just the transfer of the hose forms with the closing mold-halves of the blow-mold 15 takes place. The blow-mandrels 21 on the left side are shown in the move-in position.

By means of the hydraulic cylinder 17 the swinging frame 12 swings out downwardly into position B, whereupon with the moving-out and penetration of the blow-mandrels 21 into the mold 15, the blow process starts. The arrangement and function of one or a plurality of blow-mandrels from below is likewise possible, as well as a cooperation of the blow-mandrels set from below and from above by the application of double-molds. After the opening of the mold halves 15a, the now finished hollow bodies, yet still with their lost heads, remain on the blow-mandrels 21 and are removed by grippers (not shown) from the blow-mandrels 21 after the swinging arm 12 has left again the position B. By this arrangement, the waste portions are thereby removed and the hollow bodies are fed to a transportation device for further use, for example to a following closing device.

Figure 4:
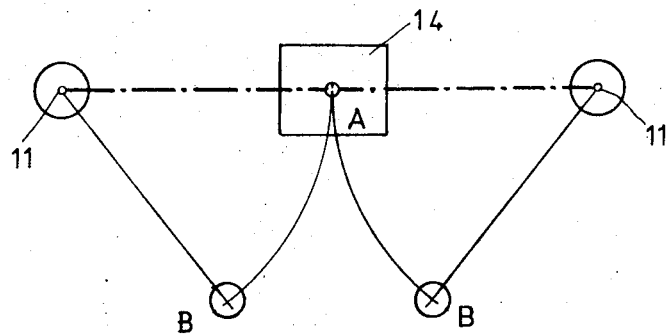
FIGS. 4 and 5 are schematic showings, with hose form receiving positions disposed in the same and in different planes to the rotary points of the swinging frame, respectively.
Figure 5:
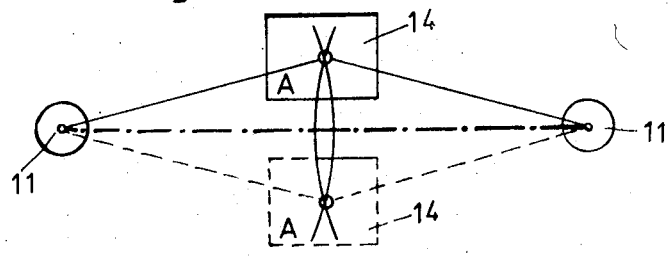

In accordance with the described example, the axles 11 of the swinging frame 12 disposed on both sides of the extruder head 2 and the end position A obtainable successively by swinging frames 12 are arranged in a horizontal plane as it is shown in the scheme of FIG. 4.

The same advantageous open structure with the freely accessible blow-molds 15 results also then, when the position A is disposed above or also below the axis plane of the swinging frame. Since neither a hindrance of the hose forms by the closing plates free from the traverses, nor a hindrance of the closing plates swinging into the position A is possible by the blow-mandrels and the hollow bodies suspended therefrom, respectively, the apparatus can develop its full ejection output on finished hollow bodies.

Within the framework of the present invention, deviations are possible, thus by example the apparatus can be used in an equally advantageous manner, by using one swinging frame only instead of both. This means also that of two present swinging frames only one can be put into operation, without occurring, thereby, a hindrance in the operational process.

While I have disclosed one embodiment of the present invention, it is to be understood that this embodiment is given by example only and not in a limiting sense.

I claim:

1. An apparatus for the production of hollow bodies of thermoplastic synthetic material in a blowing process with two blow-molds swingable between a spray head of an extruder, and a blowing station, comprising
means for alternatingly receiving extruded raw hoses in said blow-molds with their closing blow mold-halves and for feeding said raw hoses to a blow station, two U-shaped swinging frames having legs, closing plates, blow-mold halves of each of said blow-molds being disposed at the ends of said legs of one of said U-shaped swinging frames by means of said closing plates, each of said U-shaped swinging frames having a box-shaped connecting part, a flyingly mounted axle for each of said swinging frames, said U-shaped swinging frames being suspended on said axles, respectively, carrying frames securing said axles, and said axles being disposed such that the vertical symmetry plane of at least one of said spray heads is arranged in the crossing point of arcs of a circle defined by both of said blow-molds, means mounted on each of said swinging frames for maintaining the associated blow-mold in parallel orientation to itself in all swinging positions.

2. The apparatus, as set forth in claim 1, wherein said axles of said swinging frame disposed on both sides of said spray head and the position obtainable by both said blow-molds are arranged in a horizontal plane.

3. The apparatus, as set forth in claim 1, wherein said axles of said swinging frame disposed on both sides of said spray head are arranged in a plane, and the position obtainable by both of said blow-molds is arranged above and below, respectively, said plane of said axles.

4. The apparatus, as set forth in claim 1, which includes a hydraulic cylinder performing the movement of said swinging frame and disposed adjacent said carrying frame.

5. The apparatus, as set forth in claim 4, which includes a guide rod immovably disposed relative to and above said swinging frame and pivotally connected to said carrying frame at a point spaced from said axles, a control joint bar operatively pivotally connected to the other end of said guide rod and said end of said swinging frame, said guide rod affecting said closing plate by said control joint bar, and said guide rod parallel to an imaginary straight line in said leg of said swinging frame connecting said axle of said swinging frame and the common pivot axis of said control joint bar and said end of said swinging frame, and said guide rod, said control joint bar, said straight line in said leg of said frame jointly with a straight line connecting said axle of said swinging frame with the immovable pivotal connection of said guide rod with said carrying frame forming a parallelogram for the straight guidance of said blow-molds during the swinging of said swinging frame.

6. The apparatus, as set forth in claim 5, which includes a base plate supporting both said carrying frames, and including means for setting both said carrying frames relative to each other and to said extruder.

* * * * *